(12) United States Patent
Taylor (10) Patent No.: US 8,411,578 B2
(45) Date of Patent: Apr. 2, 2013

(54) SYSTEMS AND METHODS FOR PROACTIVE MANAGEMENT OF A COMMUNICATION NETWORK THROUGH MONITORING A USER NETWORK INTERFACE

(75) Inventor: William Scott Taylor, Duluth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 238 days.

(21) Appl. No.: 13/023,266

(22) Filed: Feb. 8, 2011

(65) Prior Publication Data

US 2011/0134783 A1 Jun. 9, 2011

Related U.S. Application Data

(63) Continuation of application No. 10/136,592, filed on May 1, 2002, now Pat. No. 7,899,893.

(51) Int. Cl.
*G06F 11/00* (2006.01)
*G06F 15/173* (2006.01)
*H04M 3/22* (2006.01)

(52) U.S. Cl. ..... 370/242; 370/246; 370/252; 379/14.01; 709/224; 714/25; 714/47.1

(58) Field of Classification Search .......... 370/241–252; 379/2, 14.01, 15.05, 22.03, 221.03; 709/203, 709/223–224; 714/1–2, 15, 25, 30–31, 41–47.1, 714/57, 736–737, 799
See application file for complete search history.

(56) References Cited

U.S. PATENT DOCUMENTS

| | | | |
|---|---|---|---|
| 5,724,263 A | 3/1998 | Raguram et al. | |
| 5,790,633 A | 8/1998 | Kinser, Jr. et al. | |
| 5,870,558 A | 2/1999 | Branton, Jr. et al. | |
| 5,953,389 A * | 9/1999 | Pruett et al. | 379/9 |
| 6,012,152 A * | 1/2000 | Douik et al. | 714/26 |
| 6,249,755 B1 | 6/2001 | Yemini et al. | |
| 6,353,902 B1 * | 3/2002 | Kulatunge et al. | 714/712 |
| 6,584,502 B1 | 6/2003 | Natarajan et al. | |
| 6,771,739 B1 | 8/2004 | Beamon et al. | |
| 6,779,030 B1 | 8/2004 | Dugan et al. | |
| 6,785,848 B1 | 8/2004 | Glerum et al. | |
| 6,880,086 B2 | 4/2005 | Kidder et al. | |
| 6,925,493 B1 | 8/2005 | Barkan et al. | |
| 6,925,578 B2 | 8/2005 | Lam et al. | |
| 6,952,729 B2 * | 10/2005 | Bialk et al. | 709/224 |
| 6,983,401 B2 | 1/2006 | Taylor | |
| 7,050,936 B2 | 5/2006 | Levy et al. | |

(Continued)

OTHER PUBLICATIONS

United States Patent and Trademark Office, "Notice of Allowance," issued in connection with U.S. Appl. No. 10/136,592, mailed on Oct. 28, 2010, (25 pages).

(Continued)

*Primary Examiner* — Tri H Phan
(74) *Attorney, Agent, or Firm* — Hanley, Flight & Zimmerman, LLC (57) ABSTRACT

Systems and methods for proactive management of a communication network through monitoring a user network interface are disclosed. An example method disclosed herein to proactively monitor user network interfaces comprises obtaining first information related to operation of a physical port, determining that the physical port implements both a first user network interface and a second user network interface, combining the first information with second information related to operation of a first logical port implementing the first user network interface, but not implementing the second user network interface, to assess performance of the first user network interface, and combining the first information with third information related to operation of a second logical port implementing the second user network interface, but not implementing the first user network interface, to assess performance of the second user network interface.

20 Claims, 7 Drawing Sheets

U.S. PATENT DOCUMENTS

| | | | |
|---|---|---|---|
| 7,106,843 | B1 | 9/2006 | Gainsboro et al. |
| 7,107,496 | B1 | 9/2006 | D'Ippolito et al. |
| 7,225,249 | B1 | 5/2007 | Barry et al. |
| 7,333,593 | B2 | 2/2008 | Beamon et al. |
| 7,496,655 | B2 | 2/2009 | Gopalan et al. |
| 2002/0078464 | A1* | 6/2002 | Dravida et al. ............... 725/105 |
| 2002/0133328 | A1 | 9/2002 | Bowman-Amuah |
| 2003/0018643 | A1 | 1/2003 | Mi et al. |
| 2003/0208591 | A1 | 11/2003 | Taylor |
| 2003/0208592 | A1* | 11/2003 | Taylor ........................... 709/224 |
| 2004/0060073 | A1* | 3/2004 | Bialk et al. .................... 725/129 |
| 2004/0153563 | A1 | 8/2004 | Shay et al. |
| 2006/0129499 | A1 | 6/2006 | Combar et al. |

OTHER PUBLICATIONS

United States Patent and Trademark Office, "Final Office Action" issued in connection with U.S. Appl. No. 10/136,592, mailed on Mar. 16, 2010, (24 pages).

United States Patent and Trademark Office, "Office Action," issued in connection with U.S. Appl. No. 10/136,592, mailed on Oct. 2, 2009, (20 pages).

United States Patent and Trademark Office, "Office Action," issued in connection with U.S. Appl. No. 10/136,592, mailed on Sep. 15, 2008, (29 pages).

United States Patent and Trademark Office, "Office Action," issued in connection with U.S. Appl. No. 10/136,592, mailed on Jun. 11, 2008, (20 pages).

United States Patent and Trademark Office, "Office Action," issued in connection with U.S. Appl. No. 10/136,592, mailed on Oct. 9, 2007, (17 pages).

United States Patent and Trademark Office, "Final Office Action," issued in connection with U.S. Appl. No. 10/136,592, mailed on Apr. 27, 2009 (30 pages).

United States Patent and Trademark Office, "Examiner Interview," issued in connection with U.S. Appl. No. 10/136,592, mailed on Jun. 16, 2010, (4 pages).

United States Patent and Trademark Office, "Examiner Interview," issued in connection with U.S. Appl. No. 10/136,592, mailed on Jun. 29, 2009, (4 pages).

* cited by examiner

SYSTEMS AND METHODS FOR PROACTIVE MANAGEMENT OF A COMMUNICATION NETWORK THROUGH MONITORING A USER NETWORK INTERFACE

RELATED APPLICATION

This patent arises from a continuation of U.S. application Ser. No. 10/136,592, entitled "System and Method for Proactive Management of a Communication Network through Monitoring a User Network Interface" and filed on May 1, 2002. U.S. application Ser. No. 10/136,592 is hereby incorporated by reference in its entirety.

FIELD OF THE DISCLOSURE

This invention relates generally to telecommunication networks. More particularly, the invention relates to a system and method for proactively maintaining a telecommunications network.

BACKGROUND

Proactive maintenance in a telecommunications network allows network operators to anticipate where problems may occur in the future and act proactively to prevent some customer problems from occurring. Proactive activities may also allow a network operator to determine if and help ensure that network performance service level agreements (SLAs) are being met and will continue to be met. Proactive activities preferably include identifying current and potential bottlenecks, inefficient or poorly performing components, potential failures, and others.

SUMMARY

A system and method for proactive management of a user network interface is provided. In accordance with one aspect of the invention defined by the claims, a system for monitoring performance parameters relating to a user network interface ("UNI") in a communication network is provided. The system comprises a message source parser module, a translator module, and a message recording module. The message source parser module is operative to examine an exception message sent by a network element in the communication network. The message source parser module is also operative to determine which network component the message relates to. The translator module is operative to determine if the message is related to one or more UNIs in the network. The message recording module is operative to post information from the message to one or more data records that correspond to the one or more UNIs identified by the translator module.

In accordance with another aspect of the invention defined by the claims, a computer-implemented system for monitoring performance parameters relating to a user network interface ("UNI") in a communication network is provided. The system comprises a message source parser module, a component record finder module, and a message recording module. The message source parser module is operative to examine an exception message sent by a network element in the communication network. The message source parser module is also operative to determine which network component the message relates to. The component record finder module is operative to search through component records in a component record database to identify a component that is related to the received exception message. The message recording module is operative to search the component record identified by the component record finder module to retrieve from the component record the identity of one or more UNIs affected by the component. The message recording module is also operative to post information from the message to one or more data records that correspond to the one or more UNIs identified from the component record.

In accordance with another aspect of the invention defined by the claims, a computer-implemented system for monitoring performance parameters relating to a user network interface ("UNI") in a communication network is provided. The system comprises a message source parser module, a query execution module, and a UNI record appending module. The message source parser module is operative to examine an exception message sent by a network element in the communication network and is operative to determining which network component the message relates to. The query execution module is operative to conduct a search in a database containing UNI data records to identify the UNI data records that indicate that messages relating to the component identified by the message source parser module should be posted to that UNI record. The UNI record appending module is operative to post information from the message to the one or more UNI data records identified by the query execution module.

In accordance with another aspect of the invention defined by the claims, a method for accumulating performance information relating to a user network interface ("UNI") is provided, the method comprises the steps of receiving an exception message transmitted by a network element, determining which UNIs are affected by the exception message, and ascribing information from the exception message to data records that correspond to the affected UNIs.

BRIEF DESCRIPTION OF THE DRAWINGS

In order that the invention identified in the claims may be more clearly understood, preferred embodiments of structures, systems and methods having elements corresponding to elements of the invention recited in the claims will be described in detail by way of example, with reference to the accompanying drawings, in which:

DETAILED DESCRIPTION

Figure 1:
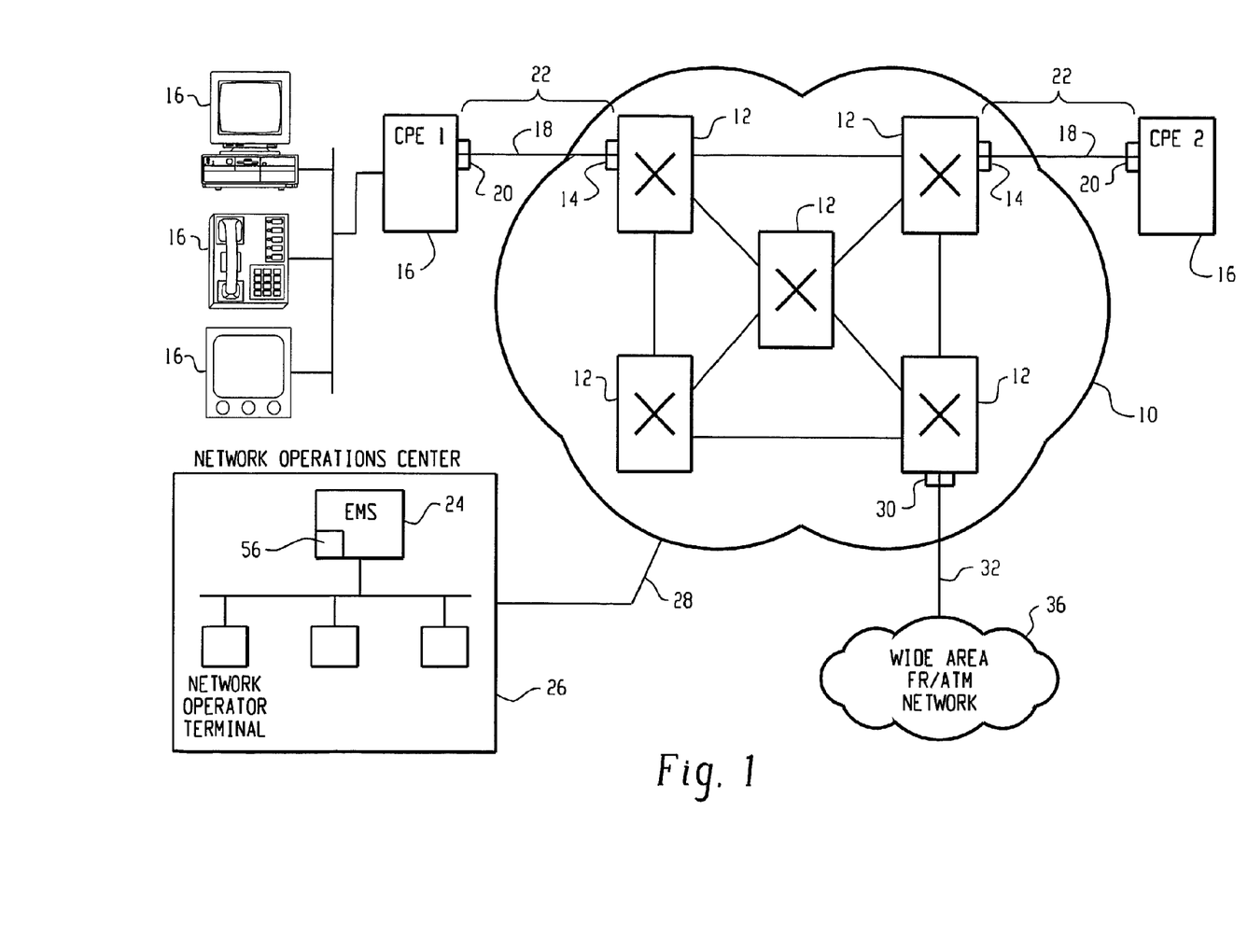
FIG. 1 is a schematic diagram of an exemplary section of a frame relay transport network.

Referring now to the drawings, FIG. 1 is a schematic diagram illustrating an exemplary section of an FR/ATM transport network 10. The transport network 10 comprises a plurality of switching network elements 12 that are coupled together. The switching network elements 12 include a plurality of network physical ports (PPORTs) 14 that allow equipment outside of the network to communicate over the network. The PPORTs 14 typically serve as the entry point for customer premises equipment (CPE) 16, such as conventional telephones, facsimile machines, private branch exchanges, voice mail systems, key telephone systems, computers, modems, telephone answering machines, alarm systems, and radio control systems, as well as many other devices, to communicate via the network. A full-duplex communication line 18 provides the communication path between the PPORTs 14 and the CPE 16, and the combination of the network PPORT 14, the full-duplex communication line 18 and a physical port 20 associated with the CPE 16 is known as a user network interface ("UNI") 22.

Also, coupled to the network 10 is an element management system ("EMS") 24 preferably located in a network operations center 26. The EMS 24 is a platform that allows a network operator to provision various equipment and facilities within the network 10.

The preferred EMS 24 is the NavisCore™ system developed by Lucent. NavisCore™ is a centralized service and network management application that delivers management and control functions for various multiservice products, such as frame relay, SMDS, ATM, and IP switch networks, on a single platform. NavisCore™ is a fully distributed and multiservice element manager. NavisCore™ is a graphically integrated UNIX-based platform that resides on Hewlett Packard's OpenView. It provides a complete network management solution based on Telecommunications Network Management (TNM) standards.

The EMS establishes a virtual channel ("VC") 28 with various network elements within the network 10 including the switching elements 12. The VCs 28 provide communication paths that allow a network operator to provision equipment and facilities in the network 10 using the EMS and to monitor the status and performance of the equipment and facilities in the network 10. The EMS also maintains a record of the configuration of the network and the status of all the equipment and facilities in the network. Each of the network elements ("NEs"), on demand or when a condition occurs that requires communication, communicates network performance information to the EMS via the VCs 28.

Some of the switching elements 12 may also include ports 30 that cooperate with other ports in other networks to form a network-to-network interface ("NNI") 32. The NNIs allow the network to exchange traffic with other networks 34 such as wide area FR/ATM networks and others.

Figure 2:
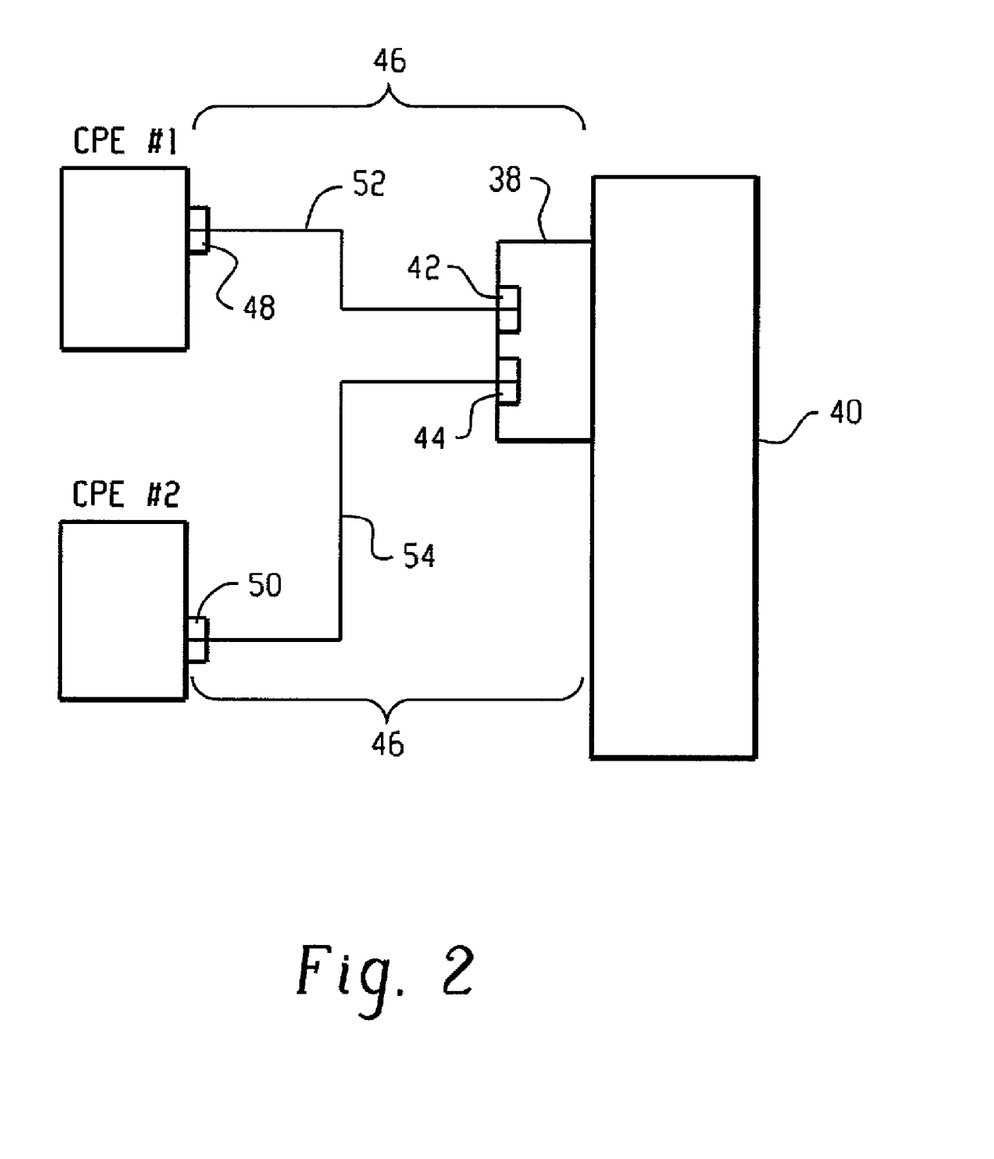
FIG. 2 is a schematic diagram that illustrates a user network interface ("UNI")

Referring now to FIG. 2, the physical port 38 on the NE 40 provides an entry point for CPE equipment to communicate via the network 10. Each physical port 38 may support one or more types of CPE and, therefore, may include one or more logical ports 42, 44. A first portion of the available bandwidth provided through the physical port may be allocated to the first logic port 42 and another portion of the available bandwidth may be allocated to the second logic port 44. Because of this allocation, multiple users can share the same physical port 38 wherein each user utilizes a portion of the available bandwidth provided by the physical port 38. In the example illustrated in FIG. 2, CPE #1 and CPE #2 each access the NE 40 via the same network physical port 38. But, CPE #1 accesses one logical port 42 and CPE #2 accesses another logical port 44.

Figure 3:
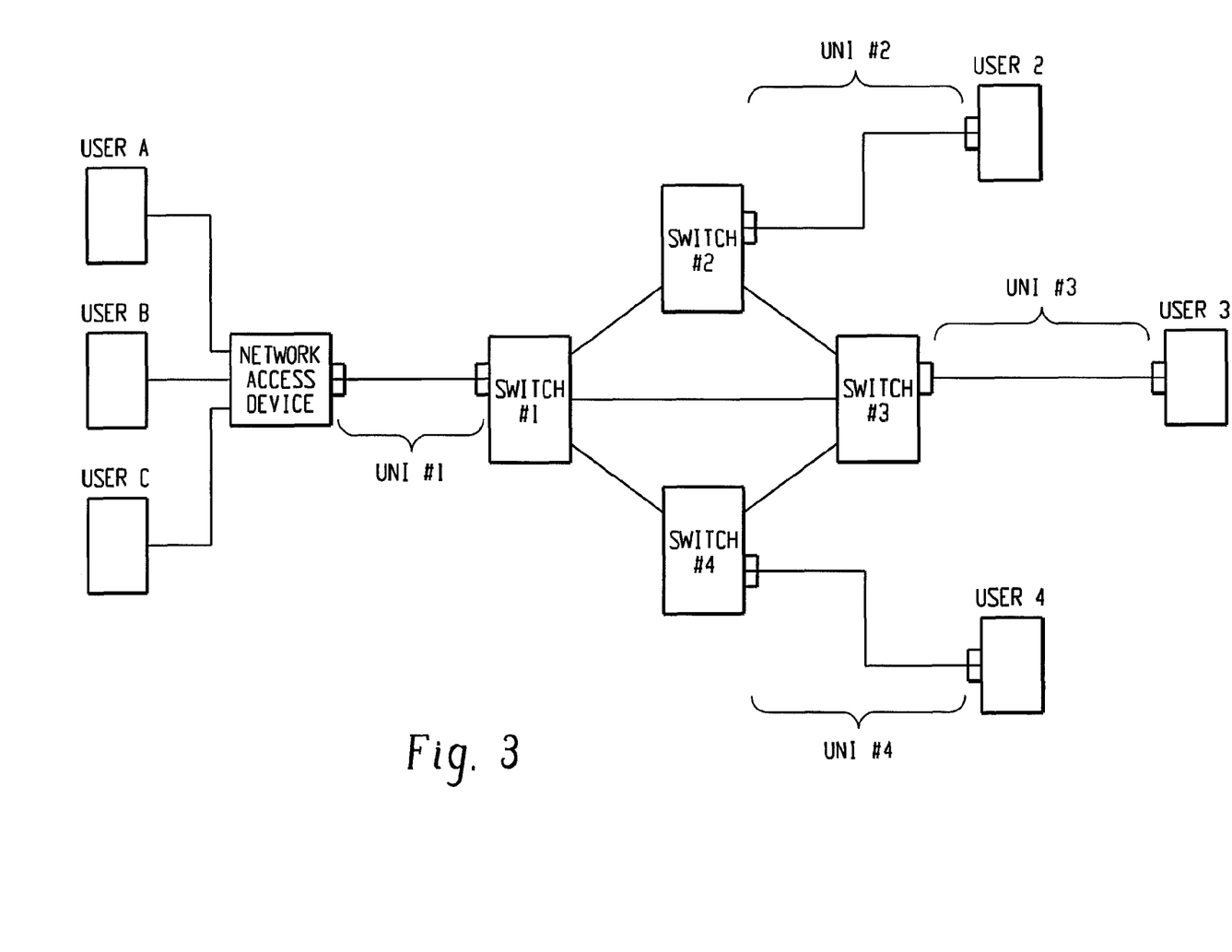
FIG. 3 is a schematic diagram of an exemplary section of a frame relay transport network illustrating multiple UNIs.

Each logical port may support one or more virtual paths through the network. With reference to FIG. 3, a first virtual path may exist between User A and User 2 wherein the virtual path flows through UNI #1, switch #1, switch #2, and UNI #2.

Another virtual path may exist between User A and User 2 wherein the virtual path flows through UNI #1, switch #1, switch #3, switch #2 and UNI #2. Each virtual path may include a plurality of virtual channels wherein each virtual channel supports traffic and wherein the virtual channels may be permanent virtual channels ("PVCs") or switched virtual circuits (SVCs").

With reference to FIG. 2, the UNI 46 associated with the network physical port 38 comprises the network physical port 38, the logical ports 42, 44, the physical port 48 on CPE #1, the physical port 50 on CPE #2, the communication path 52 between the first logical port 42 and the physical port 48 on CPE #1, and the communication path 54 between the second logical port 44 and the physical port 50 on CPE #2. The UNI 46 further comprises any virtual paths and virtual circuits including PVCs that traverse the network physical port 38.

Most maintenance activities with respect to the network 10 are performed on a reactive basis. For example, when a customer problem is detected, network operators react to the problem and dispatch service technicians to determine and isolate the problem. Efforts are being made to allow network operators to proactively maintain the network before a customer detects a problem such as a loss of service or degraded service.

Proactive maintenance allows the network operators to anticipate where problems may occur in the future and act proactively to prevent some customer problems from occurring. Proactive activities may also allow a network operator to determine if and help ensure that network performance service level agreements are being met and will continue to be met. Proactive activities preferably include identifying current and potential bottlenecks, inefficient or poorly performing components, potential failures, and others.

Referring back to FIG. 1, network operators obtain information regarding network performance preferably using the EMS 24. The EMS obtains information regarding network performance via the VCs established with various NEs. Among other things, the NEs communicate network performance information to the EMS. Because the UNI is an interface that relates directly to customers communication via the network 10, the monitoring of performance messages relating to a UNI provides valuable information relating to the quality of service provided to customers.

The preferred EMS 24 includes a network monitoring system 56 that monitors the quality of service provided to a customer by monitoring the UNI associated with that customer. Specific UNI performance parameters have not been defined. But, by monitoring parameters related to the network PPORT 14 and logical ports that are a part of the UNI and the virtual channels the traverse the UNI, the preferred monitoring system 56 can monitor UNI performance. The network operator, therefore, is provided with information that can be used to perform proactive maintenance on the network. The parameters related to the UNI include the PPORT parameters, the LPORT parameters, and the PVC or SVC parameters.

Types of PPORT parameters that can be monitored include but are not limited to the following examples: errored seconds, code violation, severely errored seconds, frame errors, and unavailable seconds. These parameters can be either for the path or the line.

Types of LPORT parameters that can be monitored include but are not limited to the following examples: packet errors, packet discards, status frames errors, number of frames transmitted, DTE error frames, DCE error frames, LMI status frames, port utilization and others depending on the type of logical service.

Types of PVC/SVC parameters that can be monitored include but are not limited to the following examples: number of frames transmitted or received, number and service level of frames transmitted and received (i.e., red, green and amber), number of far end congestion notification (FECN) sent/received, number of back end congestion notification (BECN), and others depending on the type of service.

Figure 4:
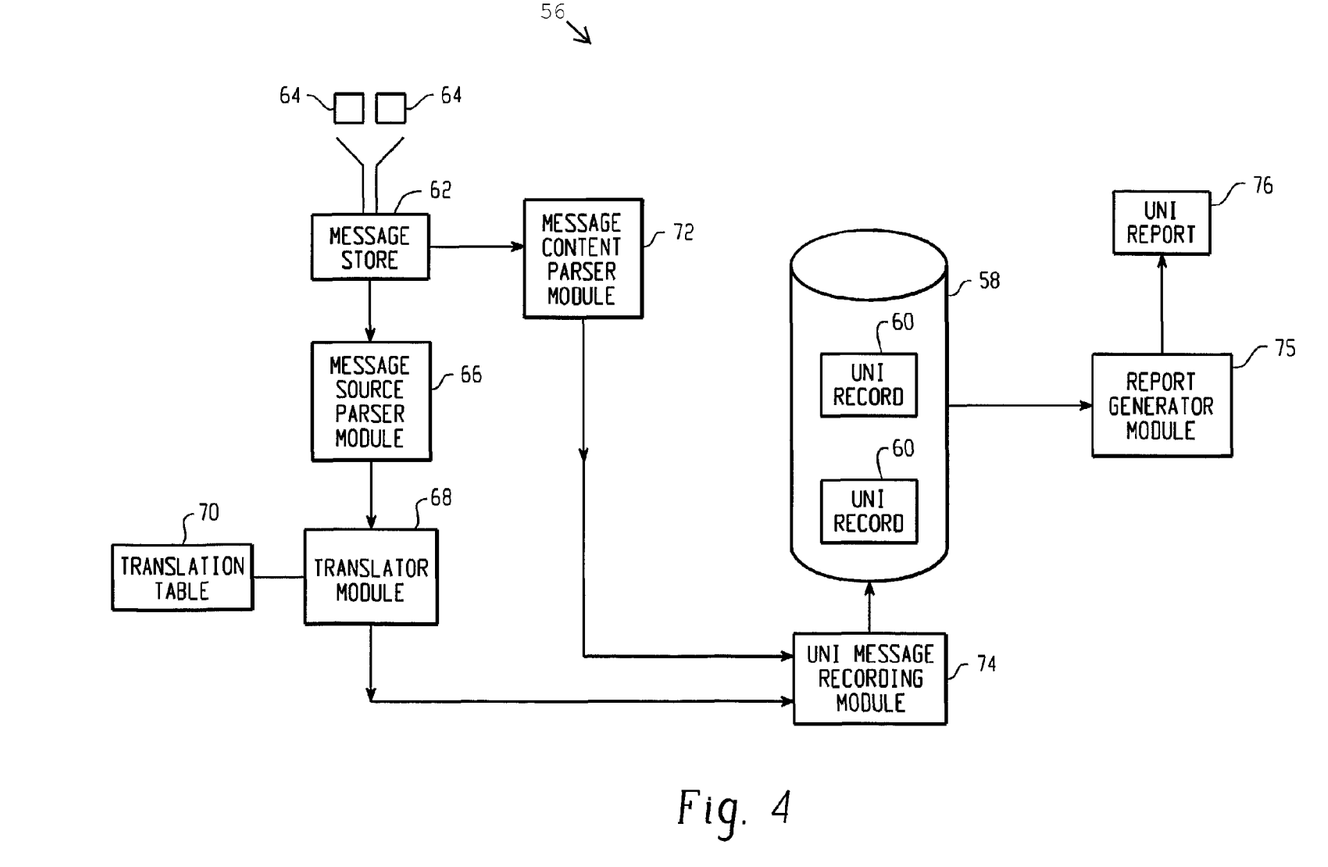
FIG. 4 is block diagram of an exemplary UNI monitoring system.

Referring now to FIG. 4, illustrated is a block diagram of an exemplary UNI monitoring system that could be implemented with the EMS. In the description that follows the term module is used. The term module as used herein is a generic term used to describe any entity such as hardware, software, firmware, or a combination of the above that causes the execution of some function.

Preferably, associated with the monitoring system 56 is a storage area 58 which more preferably comprises a database. The database 58 is used to store a number of data records including a UNI record 60 for each UNI associated with the network.

The illustrated monitoring system 56 includes a message storage area 62 for receiving exception messages 64 sent from NEs and preferably for temporarily storing the messages 64. A message source parser module 66 is provided that determines, by examining the exception message, which component, e.g., equipment or facility, the received exception message relates to.

A translator module 68, using the output from the message source parser module 66, determines which UNI the component is related to. For example, if the component is a PVC between User B and User 3, as shown in FIG. 3, then the translator will determine that PVC exception messages would relate to UNI #1 and to UNI #3. The translator module 68 preferably uses a translation table 70, which provides information regarding the relationships between components and UNIs.

A message content parser 72 is provided for retrieving the content of the messages and passing the content to a UNI message recording module 74. The UNI message recording module receives from the translator module 68 the identity of the UNI the message content relates to, queries the database for the appropriate UNI record(s) 60, and posts the content of the exception message to the appropriate UNI record(s) 60.

A network operator can then retrieve from the UNI records 60, performance information relating to one or more UNIs. Based on the performance information, a network operator can determine if proactive maintenance should occur in the network to improve a customer's service or to prevent a customer's service from degrading.

The network monitoring system preferably includes a UNI report generation module that can retrieve one or more UNI records 60 and generate a UNI report 76 for a network operator to review. The UNI report 76 could be in various forms. For example, the report could be a text or graphical display. The report 76 could be a display that provides a prioritized display of which UNIs were in greatest need of proactive maintenance. The report 76 could be a printed report or a report that was displayed on a system terminal.

Figure 5:
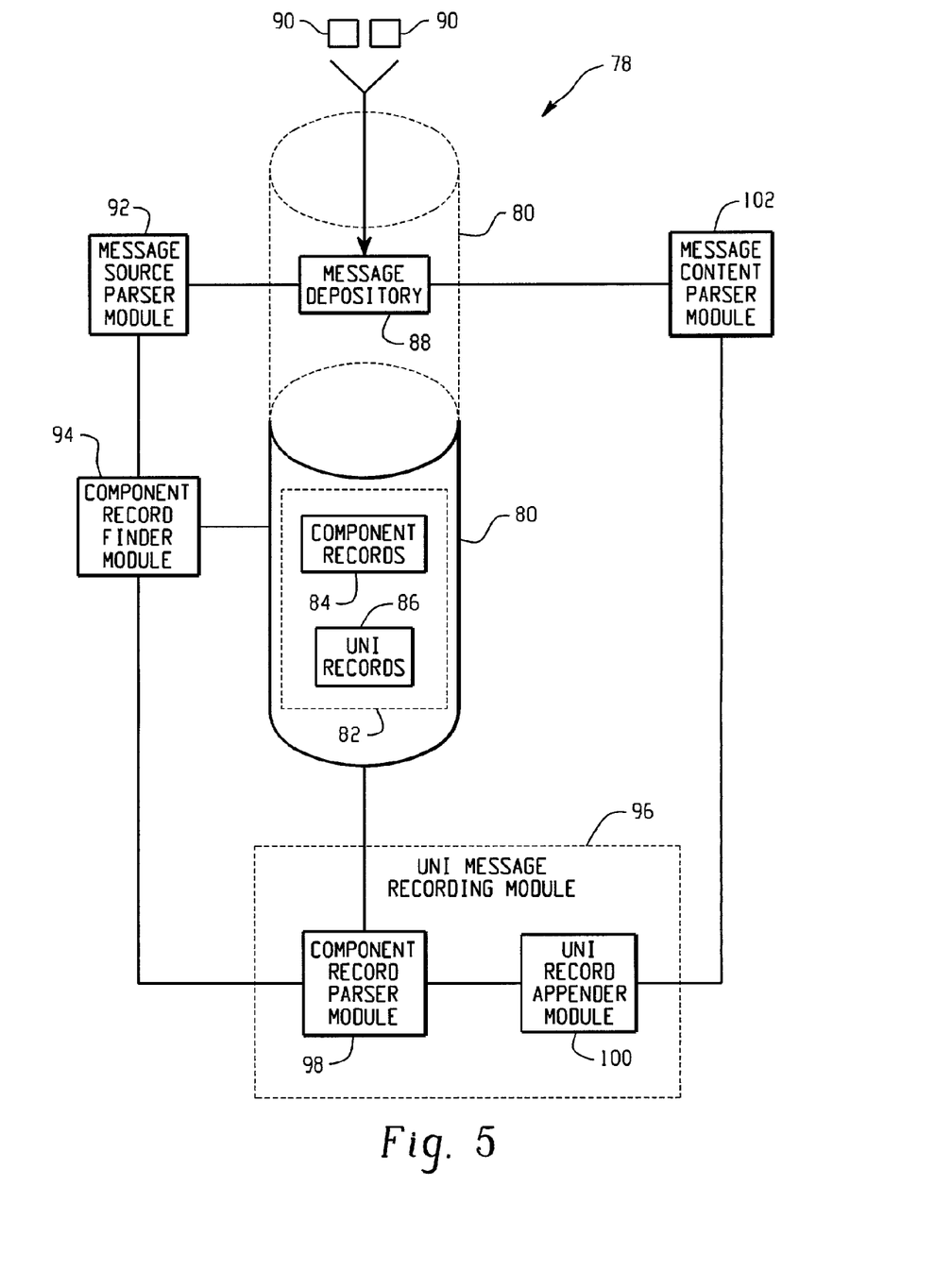
FIG. 5 is a block diagram of another exemplary UNI monitoring system.

Illustrated in FIG. 5 is a block diagram of another exemplary UNI monitoring system that could be implemented with the EMS. Preferably, associated with the monitoring system 78 is a storage area 80 which more preferably comprises a database 82. The database 82 is used to store a number of items including component data records 84 and UNI data records 86. The component data records 84 contain information regarding components in the network 10. The UNI data records 86 contain information regarding UNIs associated with the network 10.

The illustrated monitoring system 78 includes a message depository 88 for receiving exception messages 90 sent from NEs and which may comprise a register, a storage area, memory, a file, or others. A message source parser module 92 is provided that determines, by examining the exception message, the source of the message. A component record finder module 94 is provided which searches through the component records 84 to identify the component, i.e., equipment or facility, the received exception message relates to.

A UNI message recording module 96 is provided for posting to the appropriate UNI record the exception message content. The UNI message recording module 96 preferably comprises a component record parser 98 and a UNI record posting module 100. The component record parser 98 searches through the component record 84 identified by the component record finder module 94 to retrieve from the record 84 the identity of the UNI(s) affected by the component. The UNI record posting module 100 retrieves from the component record parser 98 the identity of the UNI(s) affected by the message, retrieves from a message content parser 102 the content of the exception message, and posts the message content to the appropriate UNI record 86.

Figure 6:
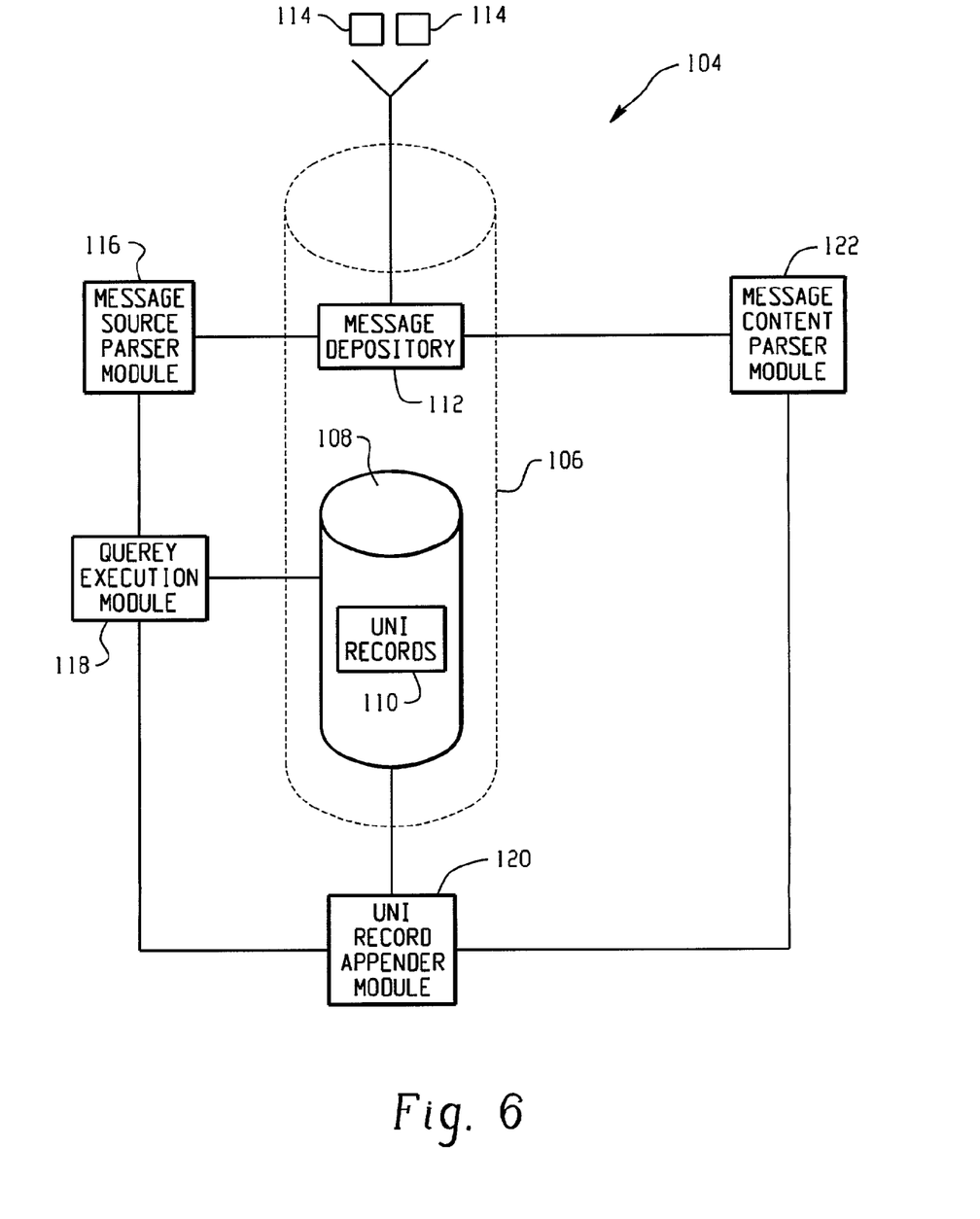
FIG. 6 is a block diagram of another exemplary UNI monitoring system.

Illustrated in FIG. 6 is a block diagram of another exemplary UNI monitoring system that could be implemented with the EMS. Preferably, associated with the monitoring system 104 is a storage area 106 which more preferably comprises a database 108. The database 108 is used to store a number of items including UNI data records 110.

The monitoring system 104 includes a message depository 112 for receiving exception messages 114 sent from NEs and wherein the message depository 112 may comprise a register, a storage area, memory, a file, or others. A message source parser module 116 is provided that identifies the component, i.e., equipment or facility, the received exception message relates to.

A query execution module 118 is provided for searching all UNI records 110 to identify the UNI records 110 that indicate that the component affects the UNI related to that UNI record 110. A UNI record appending module 120 is also provided for posting to appropriate UNI records, the content of exception messages that relate to the UNI record. The UNI record appending module receives from a message content parser 122 the content of the exception message, and posts the message content to the appropriate UNI record 110.

The UNI record 110 is preferably generated when a PPORT is provisioned for the first time. The UNI record 110 would be provided with information on all components associated with the UNI such as all LPORTs and all PVCs. Whenever a new LPORT or PVC is provisioned, the UNI record 110 would be updated to reflect the changes in components that affect the UNI.

The foregoing examples are just a few examples of monitoring systems that have elements that correspond to elements recited in the claims.

Figure 7:
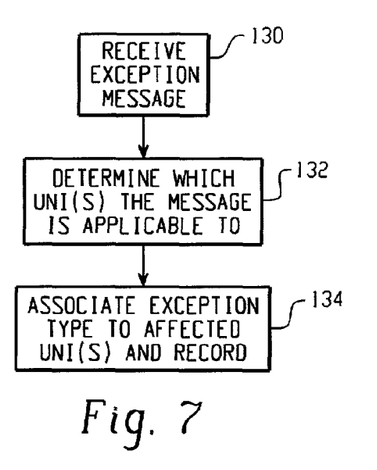
FIG. 7 is a flow chart of a preferred method for accumulating performance information relating to a UNI.

Illustrated in FIG. 7 is an example of a method for accumulating performance information relating to a UNI. The method assumes that exception messages are being reported to the EMS. This method is not the only method for accumulating performance information but merely an exemplary method. At step 130, exception messages transmitted by network elements are received. At step 132, the UNI(s) in which the exception message(s) relate to is determined. Finally, at step 134, the exception type is ascribed to the affected UNI(s).

Figure 8:
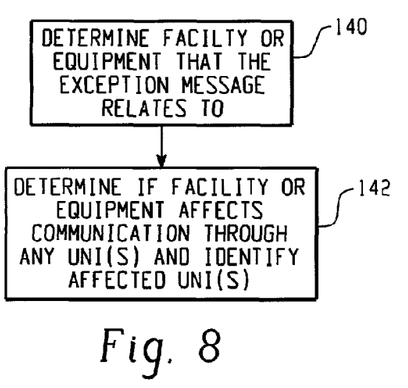
FIG. 8 is a flow chart that illustrates a method for determining the affected UNI(s)

FIG. 8 illustrates a method for determining the affected UNI(s), i.e., performing step 132 of FIG. 7. At step 140, the facility or equipment the message relates to is determined. At step 142, it is determined if a facility or equipment affects any communication channel through any UNI and if so the affected UNI(s) is identified.

Figure 9A:
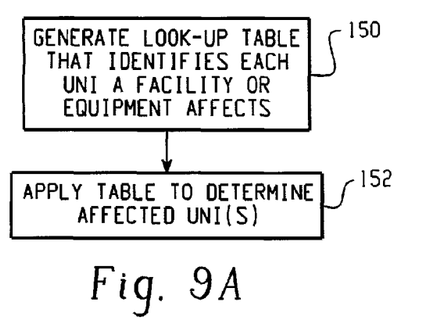
FIGS. 9A, 9B, and 9C are alternative steps for the method illustrated in the flow chart of FIG. 7.

Step 142 could be performed in a number of ways. For instance, as shown in FIG. 9A, a look-up table that identifies each UNI in which a facility or equipment affects could be generated (step 150). Then, the look-up table could be applied to determine the affected UNI(s) (step 152).

Figure 9B:
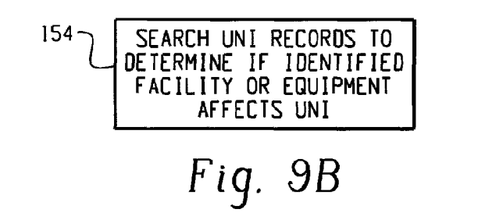

Alternatively, as illustrated in FIG. 9B, each UNI could have an associated UNI record wherein the facilities or equipment that affect the UNI could be identified. Then, each UNI record could be reviewed to determine which UNI(s) is affected by the exception message (step 154).

Figure 9C:
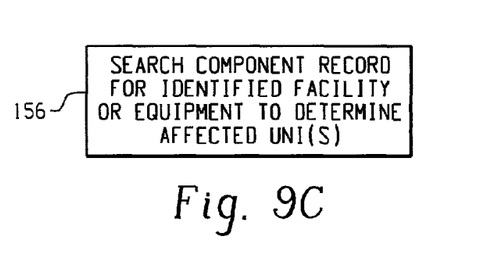

Also, as illustrated in FIG. 9C, each facility and equipment could have an associated component record which identifies the UNI(s) the component affects. Then, after the facility or equipment the exception message pertains to has been identified, the corresponding component record can be reviewed to determine which UNI(s) is affected by the exception message. Other ways for performing step 142 may also exist (step 156).

Referring back to FIG. 7, step 134 could also be performed in a number of manners. For example, after the applicable UNI has been determined, the exception type could be posted to the UNI record(s) or file(s) corresponding to the applicable UNI(s). Alternatively, one or more files or records could be generated that contained a listing of the UNIs and the applicable exceptions reported against each UNI. Other methods for performing step 134 are also contemplated.

Figure 10:
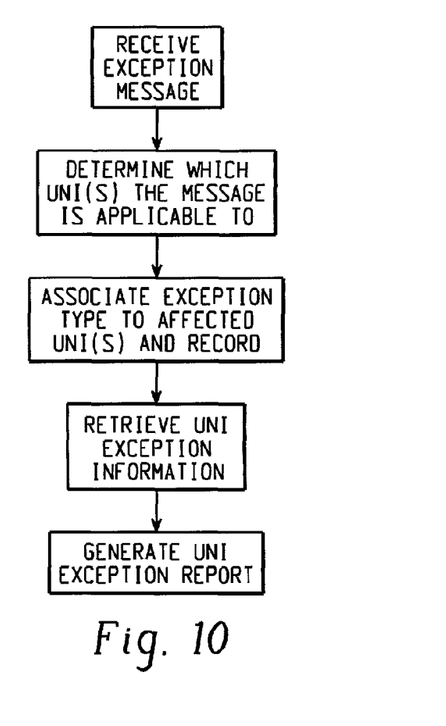
FIG. 10 is a flow chart illustrating another method for accumulating performance information relating to a UNI.

After exception information relating to UNIs is accumulated, reports preferably can be generated either automatically or on-demand. Reports could be generated periodically, such as daily or weekly, or whenever a network operator has a need for UNI exception report. The UNI exception reports could be displayed visually or graphically on a screen or displayed in a printed format. The information regarding one or more UNIs could be included on the report and the order in which the UNI information appears could be in a prioritized order. For example, in accordance with a prioritization scheme, the UNI having exceptions reported against it that are of the highest priority could be reported first on the UNI exception report. FIG. 10 illustrates a preferred sequence that results in the generation of a UNI exception report.

Network operator personnel can use the generated reports in a number of ways. The network operators can view the results on screen or via a printout. Optionally, the network operators can employ a graphical generation module to generate a graphical display. Network operator personnel can generate reports to help them identify the portions of the network 10 on which they would like to perform proactive maintenance. Illustrated in FIG. 10 is another example of a method for accumulating performance information relating to a UNI.

Other variations from these systems and methods should become apparent to one of ordinary skill in the art without departing from the scope of the invention defined by the claims. The embodiments described herein and shown in the drawings are examples of structures, systems or methods having elements corresponding to the elements of the invention recited in the claims. This written description and drawings may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. A method to proactively monitor user network interfaces, the method comprising:
   obtaining first information related to operation of a physical port;
   determining that the physical port implements both a first user network interface and a second user network interface;
   combining the first information with second information related to operation of a first logical port implementing the first user network interface, but not implementing the second user network interface, to assess performance of the first user network interface; and
   combining the first information with third information related to operation of a second logical port implementing the second user network interface, but not implementing the first user network interface, to assess performance of the second user network interface.

2. A method as defined in claim 1 further comprising ranking a first performance assessment corresponding to the first user network interface and a second performance assessment corresponding to the second user network interface to prioritize which one of the first user network interface and the second user network interface is to receive proactive maintenance, the first performance assessment combining the first information and the second information, and the second performance assessment combining the first information and the third information.

3. A method as defined in claim 1 wherein the first information includes a performance parameter for the physical port obtained from an exception message received from a network element.

4. A method as defined in claim 3 wherein the exception message is a first exception message, the second information includes a performance parameter for the first logical port obtained from a second exception message different from the first exception message, and the third information includes a performance parameter for the second logical port obtained from a third exception message different from the first and second exception messages.

5. A method as defined in claim 1 further comprising combining the first information and the second information with fourth information related to operation of a virtual channel associated with the first user network interface to assess performance of the first user network interface.

6. A method as defined in claim 5 wherein the first information includes a performance parameter for the physical port obtained from a first exception message received from a network element, the second information includes a performance parameter for the first logical port obtained from a second exception message different from the first exception message, the third information includes a performance parameter for the second logical port obtained from a third exception message different from the first and second exception messages, and the fourth information includes a performance parameter for the virtual channel obtained from a fourth exception message different from the first, second and third exception messages.

7. A method as defined in claim 5 further comprising combining the first information and the third information with the fourth information related to operation of the virtual channel to assess performance of the second user network interface when the virtual channel is determined to also be associated with the second user network interface.

8. A method as defined in claim 1 wherein obtaining the first information comprises:
receiving an exception message from a network element; and
parsing the first information from the exception message.

9. A method as defined in claim 1 wherein determining that the physical port implements both the first user network interface and the second user network interface comprises:
determining that an exception message providing the first information is related to the physical port; and
evaluating a mapping of network components to user network interfaces associated with the network components, the network components including the physical port, the first logical port and the second logical port, the mapping indicating that the physical port is associated with both the first user network interface and the second user network interface, the mapping indicating that the first logical port is associated with the first user network interface but not the second user network interface, and the mapping indicating that the second logical port is associated with the second user network interface but not the first user network interface.

10. A method as defined in claim 1 wherein combining the first information with the second information comprises accumulating the first information and the second information in a data record corresponding to the first user network interface.

11. A system to proactively monitor user network interfaces, the system comprising:
a message parser to:
determine that an exception message received from a network element is related to a physical port; and
obtain first information related to operation of the physical port from the received exception message; and
a processor communicatively coupled with the message parser, the processor to:
determine that the physical port implements both a first user network interface and a second user network interface;
combine the first information with second information related to operation of a first logical port implementing the first user network interface, but not implementing the second user network interface, to assess performance of the first user network interface; and
combine the first information with third information related to operation of a second logical port implementing the second user network interface, but not implementing the first user network interface, to assess performance of the second user network interface.

12. A system as defined in claim 11 wherein the processor is further to rank a first performance assessment corresponding to the first user network interface and a second performance assessment corresponding to the second user network interface to prioritize which one of the first user network interface and the second user network interface is to receive proactive maintenance, the first performance assessment to combine the first information and the second information, and the second performance assessment to combine the first information and the third information.

13. A system as defined in claim 11 wherein the exception message is a first exception message, the first information includes a performance parameter for the physical port, the second information includes a performance parameter for the first logical port obtained from a second exception message different from the first exception message, and the third information includes a performance parameter for the second logical port obtained from a third exception message different from the first and second exception messages.

14. A system as defined in claim 11 wherein the processor is further to combine the first information and the second information with fourth information related to operation of a virtual channel associated with the first user network interface to assess performance of the first user network interface.

15. A system as defined in claim 14 wherein the exception message is a first exception message, the first information includes a performance parameter for the physical port, the second information includes a performance parameter for the first logical port obtained from a second exception message different from the first exception message, the third information includes a performance parameter for the second logical port obtained from a third exception message different from the first and second exception messages, and the fourth information includes a performance parameter for the virtual channel obtained from a fourth exception message different from the first, second and third exception messages.

16. A system as defined in claim 14 wherein the processor is further to combine the first information and the third information with the fourth information related to operation of the virtual channel to assess performance of the second user network interface when the virtual channel is determined to also be associated with the second user network interface.

17. A system as defined in claim 11 wherein the processor is to evaluate a mapping of network components to user network interfaces associated with the network components to determine that the physical port implements both the first user network interface and the second user network interface, the network components including the physical port, the first logical port and the second logical port, the mapping indicating that the physical port is associated with both the first user network interface and the second user network interface, the mapping indicating that the first logical port is associated with the first user network interface but not the second user network interface, and the mapping indicating that the second logical port is associated with the second user network interface but not the first user network interface.

18. A system as defined in claim 17 wherein the mapping is implemented by a set of data records storing information for a respective set of network components included in a communication network, the set of network components including the physical port, first logical port and the second logical port, each data record for a respective network component identifying each user network interface associated with the respective network component, a first data record for the physical port identifying that the first user network interface and the second user network interface are associated with the physical port.

19. A system as defined in claim 17 wherein the mapping is implemented by a set of data records storing information for a respective set of user network interfaces included in a communication network, each data record for a respective user network interface identifying each network component associated with the respective user network interface, a first data record for the first user network interface identifying that the physical port and the first logical port are associated with the first user network interface, a second data record for the second user network interface identifying that the physical port and the second logical port are associated with the second user network interface.

20. A system as defined in claim 11 wherein the system further includes a database to store records, the processor is to accumulate the first information and the second information in a record corresponding to the first user network interface.

* * * * *